J. VON VASS.
PROCESS OF MANUFACTURING STAPLES.
APPLICATION FILED APR. 22, 1914.
1,169,698.  Patented Jan. 25, 1916.
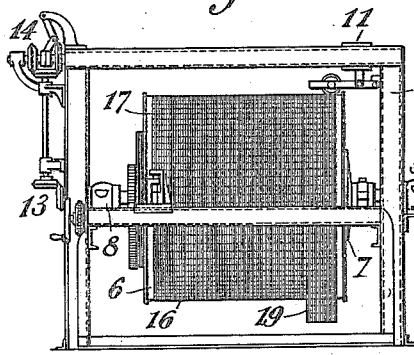
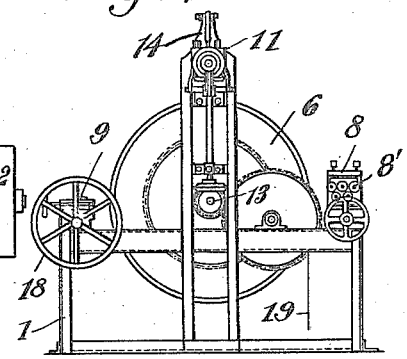
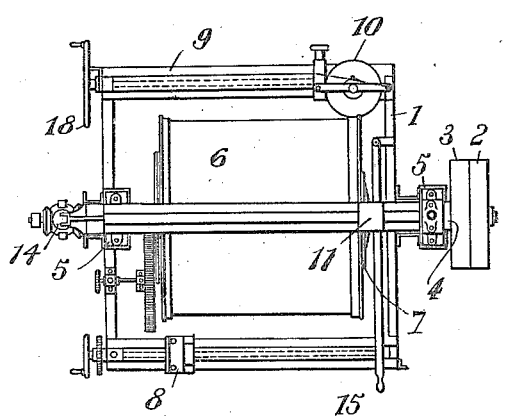
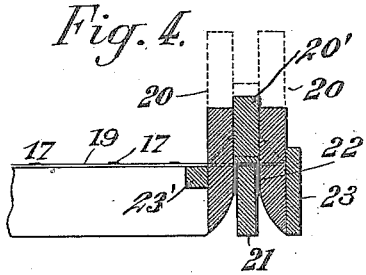
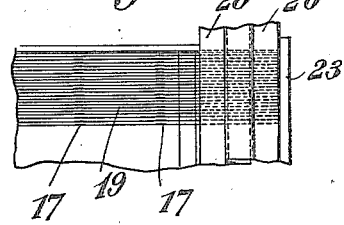
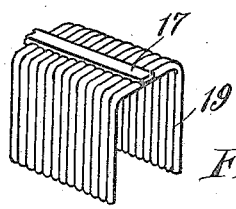
Witnesses:
Inventor:
Josef von Vass.
Attorney.

UNITED STATES PATENT OFFICE.

JOSEF von VASS, OF CHARLOTTENBURG, GERMANY.

PROCESS OF MANUFACTURING STAPLES.

1,169,698.  Specification of Letters Patent.  Patented Jan. 25, 1916.

Application filed April 22, 1914. Serial No. 833,749.

*To all whom it may concern:*

Be it known that I, JOSEF VON VASS, a subject of the German Emperor, and resident of Charlottenburg, Germany, have invented certain new and useful Improvements in Processes of Manufacturing Staples, of which the following is a specification.

This invention has relation to an improved process for manufacturing staples, and particularly to that variety of staples employed in the bookbinding art for securing together the collated leaves of pamphlets, etc.

Heretofore difficulty has been encountered in placing the staples and arranging them uniformly in the guides of a bookbinding machine. This is due to their diminutiveness and the slenderness of the wire from which they are formed.

Therefore it is here proposed to manufacture staples in such a manner that they may be supplied to the trade in banks of staples, having their prongs uniformly arranged, and having the intermediate portions of the staples connected together by an easily breakable material.

I do not wish to claim in this application any particular means for forming the staples but I have illustrated in the accompanying drawings a machine particularly adapted to carry out my process.

Figure 1 is a side location of the machine. Fig. 2 is an end elevation thereof. Fig. 3 is a plan view. Fig. 4 is a detail section through the staple bending device; and Fig. 5 is a plan view thereof. Fig. 6 is a perspective view of a number of finished staples.

Inasmuch as the particular constructive details of the machine illustrated are unessential to the proper carrying out of the process (a number of other ways can be readily devised) I will describe the main elements only.

1 designates a frame; 2 and 3 are fixed and idle pulleys mounted on a shaft 4 which is journaled in a bearing 5.

A rotatable drum 6 is loosely mounted on the shaft and is adapted to become fixed for rotation with the shaft by means of a friction clutch 7, operated by a lever 15. Upon opposite sides of the drum 6 and disposed in parallel relation thereto are frame members 8 and 9, carrying a wire guide 8', and a rotary cutter 10, respectively. Above the drum and also disposed in parallel relation thereto is a frame member which supports a movable soldering apparatus 11. This soldering apparatus is adapted to be moved back and forth across the face of the drum, any suitable means being provided to accomplish this. A bevel gearing 13 furnishes power to a reversing gearing 14, which is conventionally illustrated, and the oscillation of the soldering apparatus may be accomplished through this reversing gear in any desired manner.

In carrying out my process with the machine illustrated, I first provide a reel of wire which is the raw material from which the staples are to be formed, drawn to the desired diameter according to the size and strength of staple required. I pass the end of the wire through rollers in the guide 8' and then secure the end to the face of the drum 6. Now upon rotating the drum and slowly moving the guide parallel to the drum, the wire will become wound around the drum in a uniform helix, the convolutions of which are closely spaced.

Upon the completion of the above described winding operation the drum is held stationary and the soldering apparatus is moved across the face of the drum, leaving a trail of solder which connects the convolutions of the helix. When the soldering apparatus has completed its travel throughout the length of the drum, the said drum is slightly rotated, the amount of rotation to be imparted depending upon the length of staple desired, as will be subsequently seen. The soldering apparatus is moved back to its former position, thereby leaving a second trail of solder, parallel to the first, and also serving to connect the convolutions of the helix. When the entire diameter of the drum and helix has been covered with rows of solder, the cutter 10 is moved parallel to the drum by rotating the hand wheel 18 and the convolution of the helix is severed at a point midway between two rows of solder.

It is preferable that only a few of the convolutions be severed at one time, a strip 19 being illustrated in Fig. 1 in the act of becoming disengaged from the drum. This strip of what may be termed connected staple blanks is next fed into a bending device illustrated in Figs. 4 and 5. The ends of the freshly cut staple blanks are held against a block 23 and a shear block 23' supports the wires. A pair of vertically movable forming tools designated 20, are now permitted to descend, and the co-action between the edge of one of the formers and the shear block 23' results in again severing the blank wires at a point midway between the rows of solder. Upon a further downward movement of the forming tools 20, the curved faces thereof operate to bend the ends of the staple blanks downward against the faces of an anvil block 21, thereby producing two right angle bends in the wires. A plunger descending between the forming tools straightens out the intermediate portions of the staples, which would otherwise remain slightly curved.

The result of this process, as will be seen by reference to Fig. 6, is a series or bank of staples having their intermediate portions connected by solder. Thus it will be seen that a bank of these staples may be placed instantly in the guide of a bookbinding machine, and each staple as it is required, may be readily disengaged from its neighbor.

I claim:—

1. A process for manufacturing staples which consists in forming a length of wire into a helix, connecting together the convolutions of the wire by rows of some easily breakable material, said rows being disposed upon the convolutions in a direction parallel to the axis of the helix, severing the convolutions of the wires at points midway between two rows of breakable material to form a strip of connected staple blanks, and finally bending the ends of the staple blanks toward each other to form a bank of connected staples.

2. The herein described process of manufacturing staples which consists in first winding a length of wire around a drum to form a helix of wire whose convolutions are closely spaced, depositing rows of solder on the convolutions, said rows of solder being disposed thereon in a direction parallel to the axis of the helix, cutting the convolutions of the wire at a point midway between two rows of solder, thereby producing a strip of short lengths of wire whose intermediate portions are connected by solder, and finally bending the ends of the said short lengths toward each other to form a bank of staples.

In testimony whereof I have hereunto set my hand in presence of two witnesses.

JOSEF von VASS.

Witnesses:
 WOLDEMAR HAUPT,
 HENRY HASPER.